United States Patent
Porter et al.

(10) Patent No.: US 9,578,684 B2
(45) Date of Patent: Feb. 21, 2017

(54) ANTENNA ARRANGEMENT

(71) Applicant: Cambridge Communication Systems Limited, Cambridge (GB)

(72) Inventors: John David Porter, Ely (GB); Melvyn Noakes, Ely (GB)

(73) Assignee: Cambridge Communication Systems Limited, Cambridge (GB)

( * ) Notice: Subject to any disclaimer, the term of this patent is extended or adjusted under 35 U.S.C. 154(b) by 0 days.

(21) Appl. No.: 14/782,704

(22) PCT Filed: Apr. 7, 2014

(86) PCT No.: PCT/GB2014/000134
§ 371 (c)(1),
(2) Date: Oct. 6, 2015

(87) PCT Pub. No.: WO2014/167271
PCT Pub. Date: Oct. 16, 2014

(65) Prior Publication Data
US 2016/0050715 A1    Feb. 18, 2016

(30) Foreign Application Priority Data
Apr. 9, 2013 (GB) .................................. 1306396.1

(51) Int. Cl.
*H04M 1/00* (2006.01)
*H04W 88/08* (2009.01)
*H01Q 21/00* (2006.01)
*H01Q 21/20* (2006.01)
*H01Q 1/24* (2006.01)
*H01Q 13/00* (2006.01)

(52) U.S. Cl.
CPC .......... *H04W 88/08* (2013.01); *H01Q 21/0056* (2013.01); *H01Q 21/20* (2013.01); *H01Q 1/246* (2013.01); *H01Q 13/00* (2013.01)

(58) Field of Classification Search
CPC ............................... H01Q 13/02; H01Q 21/20
USPC ...... 455/562.1, 25, 575.7; 343/772, 786, 773
See application file for complete search history.

(56) References Cited

U.S. PATENT DOCUMENTS

| | | | |
|---|---|---|---|
| 6,462,717 B1 * | 10/2002 | Wheelock ................ | H01Q 1/42 343/872 |
| 8,238,318 B1 * | 8/2012 | Negus .................... | H04W 84/12 370/310 |
| 2009/0303147 A1 * | 12/2009 | Choudhury ........ | H01Q 13/0283 343/776 |
| 2015/0365276 A1 * | 12/2015 | Porter ................... | H01Q 21/20 370/254 |

* cited by examiner

*Primary Examiner* — Sonny Trinh
(74) *Attorney, Agent, or Firm* — Burns & Levinson LLP; Bruce D. Jobse

(57) ABSTRACT

A wireless node (10) comprises an RF modem (12), an RF switch array (14) connected to the RF modem (12), the RF switch array (14) comprising a layer of circuit board (18) sandwiched between layers of conductive material (20, 22) and a plurality of antennas (16) connected to the circuit board (18) of the RF switch array (14) via waveguides (36) present in the layers of conductive material (20, 22), a first subset of the antennas (16) arranged in a first horizontal plane H1 and a second subset of the antennas (16) arranged below the first horizontal plane H1 in a second horizontal plane H2.

11 Claims, 9 Drawing Sheets

ANTENNA ARRANGEMENT

CROSS-REFERENCE TO RELATED APPLICATIONS

This application is a U.S. national stage application under 35 U.S.C. 371 of co-pending International Application No. PCT/GB2014/000134, filed on Apr. 7, 2014, and entitled IMPROVED ANTENNA ARRANGEMENT, which in turn claims priority to and benefit of Great Britain Patent Application No. 1306396.1, filed on Apr. 9, 2013, which is incorporated by reference herein in its entirety for all purposes.

This invention relates to a wireless node and to a method of operating the wireless node.

Wireless communication is very widely used in the developed world. For example, mobile telephones are virtually ubiquitous and are commonly carried by their users at all times. Such telephones are traditionally used for making and receiving telephone calls and sending and receiving short messages (SMS). The more advanced modern phones, often referred to as smartphones, have further provision for advanced data services such as the sending and receiving of emails and the accessing of wide area networks such as the Internet. Advances in wireless technology have resulted in a progression in the use of wireless standards from the original analogue service, through GSM and 3G to emerging 4G and related standards. These standards have led to the development of ever more capable handheld devices.

In conjunction with the advances in technology required of the handset, the increased usage of mobile phones and the more data intensive services that are now commonly used has led to an increased load on the infrastructure providing the wireless service. A mobile phone wireless network has been typically configured as a set of wireless base stations that cover one or more cells that are then connected into a wired backbone telecommunication service. As more and more demand is placed on the wireless network, then base stations are sited closer together with smaller cells. In urban areas in particular, given the high density of users, the locating of base stations is becoming a significant technical problem, given that a base station must have a wired connection into the wired backbone telecommunication service. It is not always possible to physically locate a base station in the precise location that would be desirable from the point of view of the wireless network provision.

It is therefore an object of the invention to improve upon the known art.

According to a first aspect of the present invention, there is provided a wireless node comprising an RF modem, an RF switch array connected to the RF modem, the RF switch array comprising a layer of circuit board sandwiched between layers of conductive material and a plurality of antennas connected to the circuit board of the RF switch array via waveguides present in the layers of conductive material, a first subset of the antennas arranged in a first horizontal plane and a second subset of the antennas arranged below the first horizontal plane in a second horizontal plane.

According to a second aspect of the present invention, there is provided a method of operating a wireless node comprising an RF modem, an RF switch array connected to the RF modem the RF switch array comprising a layer of circuit board sandwiched between layers of conductive material, and a plurality of antennas connected to the circuit board of the RF switch array via waveguides present in the layers of conductive material, a first subset of the antennas arranged in a first horizontal plane and a second subset of the antennas arranged below the first horizontal plane in a second horizontal plane, the method comprising the steps of generating radio signals at the RF modem, communicating the generated radio signals to the RF switch array, selecting an antenna for transmitting the generated radio signals and transmitting the generated radio signals from the selected antenna.

Owing to the invention, it is possible to provide a wireless node that is compact and easy to construct and can be used, for example, in conjunction with a base station to provide the route to a wired backbone that does not require the base station to be directly connected to the wired telecommunication network. The provision of the antennas in two different horizontal planes, one above the other, means that antennas can be selected at a transmitting node and at a receiving node so that the likelihood of destructive interference from a signal reflected from the ground is greatly reduced. The difference in the horizontal height between the two subsets of antennas provides sufficient antenna options to greatly reduce the risk of destructive interference from ground reflected signals.

The primary reason for creating the dual, vertically stacked antenna configuration is to help manage the effect of vertical multipath. Similarly to the more commonly considered horizontal plane equivalent, radio signals arriving at different times will result in a destructive/constructive interference pattern. In the horizontal plane example, the receiving antenna only has to move a distance of between ¼ and ½ wavelength to move out of a space of low signal level to one of higher signal level, which is relatively easy to do if the antenna is easily moved in the horizontal plane. When working with a physically fixed, directional antenna system, the most problematic multipath affect is seldom in the horizontal plane, since selecting an alternative signal path addresses this issue. Vertical multipath (with the signal reflected from a large flat road or similar surface, for example) is addressed by switching between the vertically separated antennas.

The wireless node uses multiple antennas per node to form multiple arbitrary communication links with other nodes. There is no pre-determination of these paths, the system is self-organising Switching between independent antenna elements is used to provide directionality, not phased array beam forming. Space-domain filtering is achieved by use of sectored antenna switching rather than polarisation. The design of the wireless node achieves spatial diversity action in an array of independent antennas, in a physically compact envelope, and does not require the node to be informed externally about its environment.

The structure of the wireless node uses an RF switch array that is comprised of a circuit board that is sandwiched between two metal plates. The RF switch array is directly connected to the two horizontal subsets of antennas, with waveguides being provided in the metal plates that transfer the RF signals from the circuit board to the antennas. This provides a robust and compact design which does not require any soldering of signal launches to the circuit board nor does it require any cabling connecting components together. The use of direct launch of signals from the circuit board to waveguide provides a reliable and low-loss distribution of the radio signals from the radio subsystem to a plurality of sectored antennas, in an instantiation that can be quickly assembled as a single stack of components. The metal plates provide good structural integrity for the node and also act as heatsinks to transfer heat generated by the components on the circuit board away from the RF switch array.

The compact configuration of the wireless node, with the antennas arranged around an RF switch array, means that the wireless node can be easily sited in urban areas, with the plurality of antennas providing an excellent field of coverage. Multiple such nodes can be used together to provide a localised wireless provision that will create the interface between a wireless base station and the required wired telecommunication connection. The wireless node can be located on lampposts and other similar structures that are common and widespread in urban environments.

In a preferred embodiment, the wireless node comprises a series of layers. The layers of the wireless node are (from bottom to top), an interface board (power supply, weatherproof connectors and passive networking interface components), a digital processing board (CPU, memory, network switching, digital signal processing and analogue to digital conversions), a radio board (analogue radio from I/Q baseband to R/F, waveguide transitions), a duplexer with waveguide interfaces, a switch board with waveguide transitions and interfaces to duplexer and antennas and an antenna array.

Preferably, each antenna comprises a horn connected to the RF switch array at a proximal end of the horn and open at a distal end of the horn and preferably, adjacent antennas are in direct contact with each other. The configuration of the antennas as horns that are connected to the RF switch area at one end and open at the other end provides a simple and efficient arrangement of the antennas while also providing a wide field of view for the wireless output. The antennas are preferably slotted horn antennas which make it possible to build short antennas with high performance. In one embodiment, the antennas use only flat sheets that are bolted together and then bolted into the switch chassis. In a second embodiment, the antennas are built from only two elements, each of which is relatively easy to build on a CNC machine.

Advantageously, each subset of the antennas defines an arc around the RF switch array greater than 180 degrees and less than 270 degrees. The antennas provide the field of view of the wireless node and the greater the field of view that is provided, the more flexibility that is delivered in the placing of the wireless nodes in order to provide the necessary routing. The antennas are placed in two horizontal planes around the central RF switch array, which results in the antennas being located in an arc around the RF switch array, and which controls which antenna is used according to the desired routing of the radio signals from the wireless node.

Preferably, adjacent antennas in each subset of the antennas are spaced apart from each other and the spacing between two adjacent antennas in a subset of the antennas is filled by an antenna in the other subset of the antennas. In the preferred embodiment, half the number of antennas are located in the first horizontal plane and half the number of antennas are located in the second horizontal plane. The antennas in this arrangement are spaced apart, with the spacing between each antenna being roughly the width of an antenna. This creates two horizontal subsets of antennas with spaces in-between. The two subsets of antennas are mounted such that they are out of phase, so a gap between two adjacent antennas in one subset is filled by an antenna in the other subset, which is either directly below or directly above the gap between two antennas.

Ideally, the wireless node also comprises a base and a radome that contain the internal components of the wireless node. The RF subsystems form a central core of horizontal layers of circuit boards and aluminium material that are compact and easy to assemble. The antennas can be connected at the top of the component layers and all of these internal components can be located within the base and radome. The base and radome provide weather shielding of the internal components and also provide a way of dispersing heat from the components, when they are operational. The wireless node provides a stacked assembly of the internal components, a separation of electrical and thermal bonds and mating surfaces from the weatherproof seal and a simple build from the bottom up.

Embodiments of the present invention will now be described, by way of example only, with reference to the accompanying drawings, in which.

Figure 3:
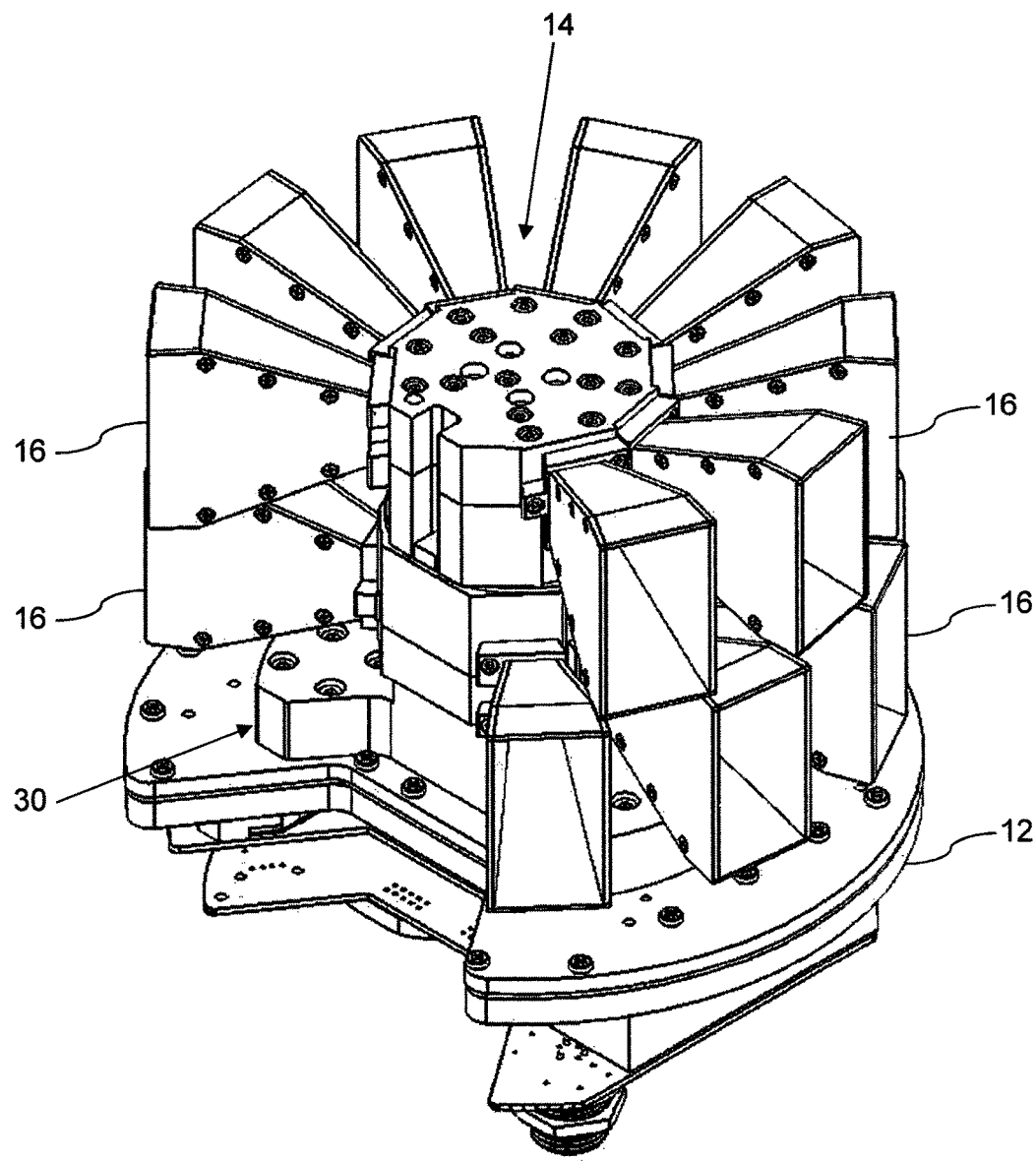
Figure 4:
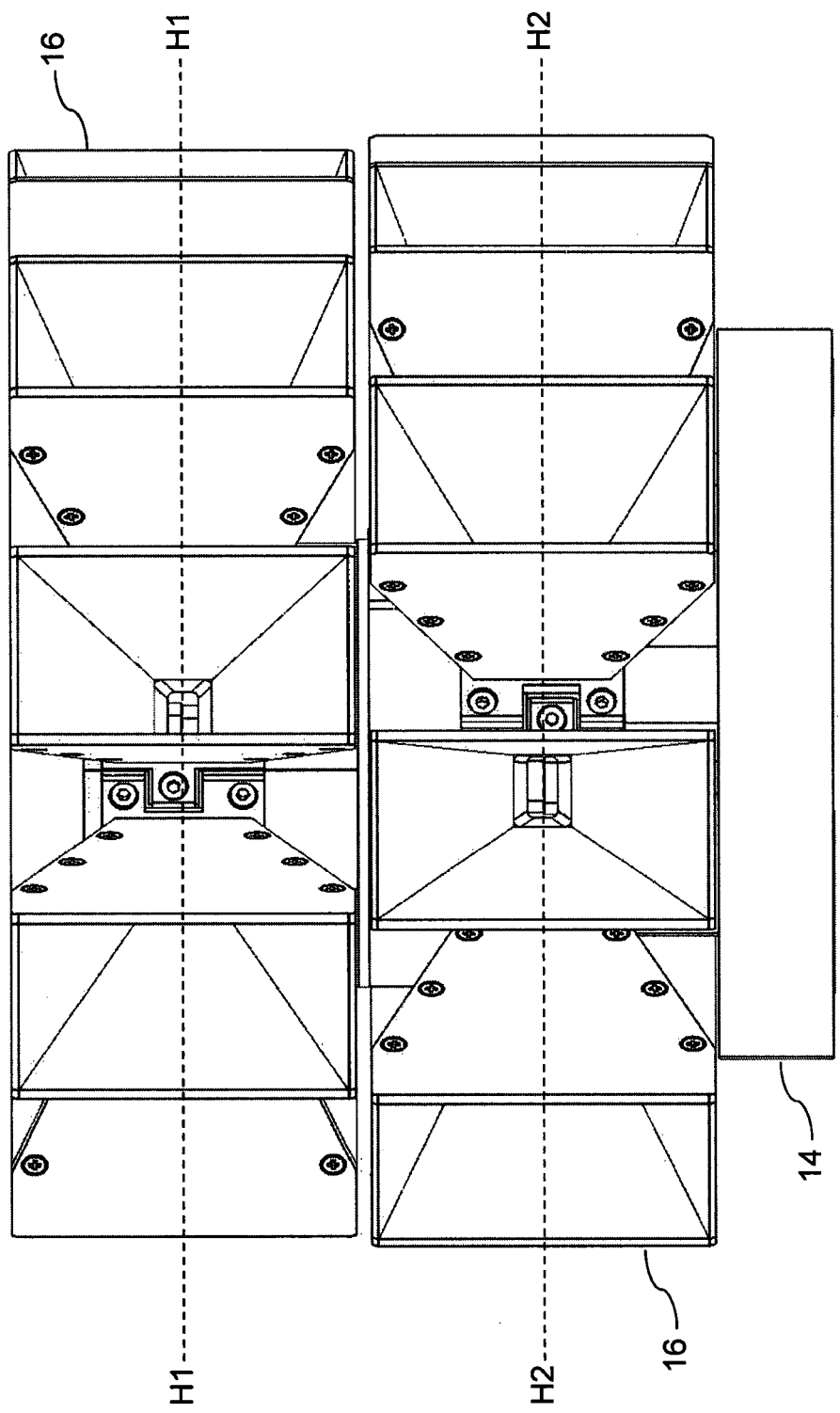
Figure 5:
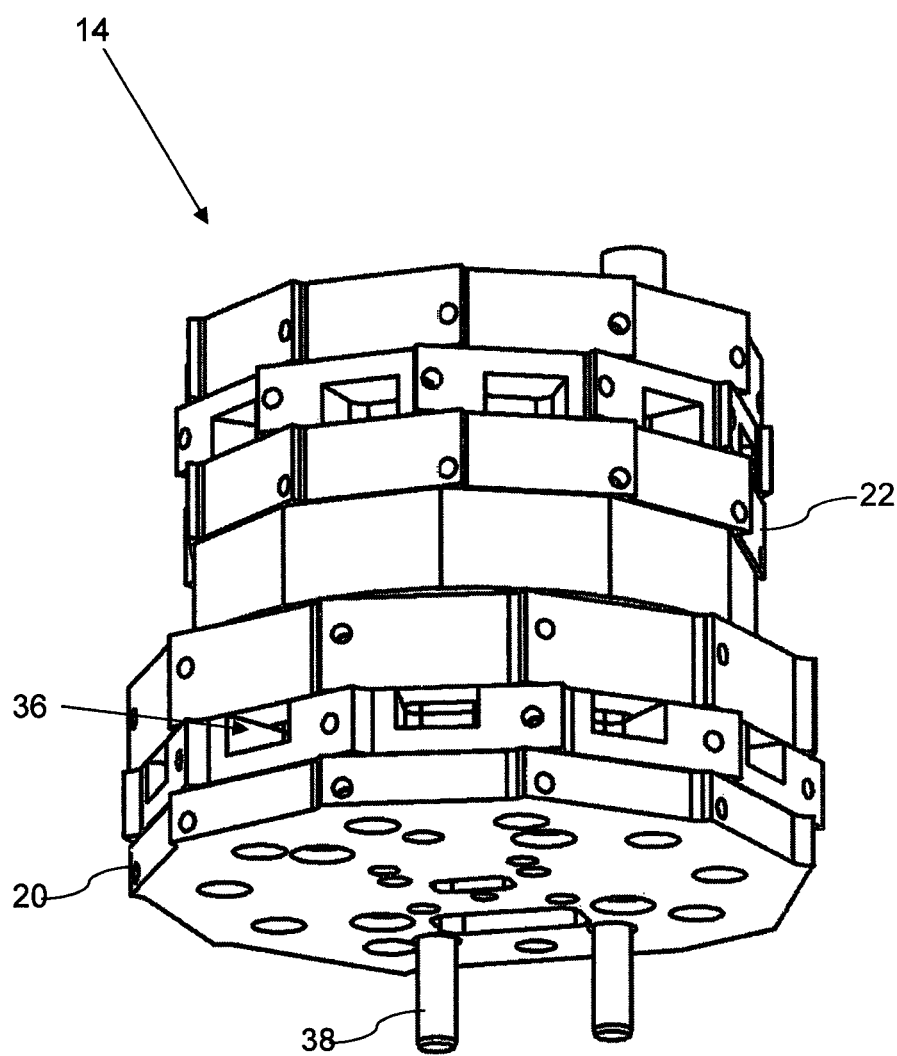
Figure 6:
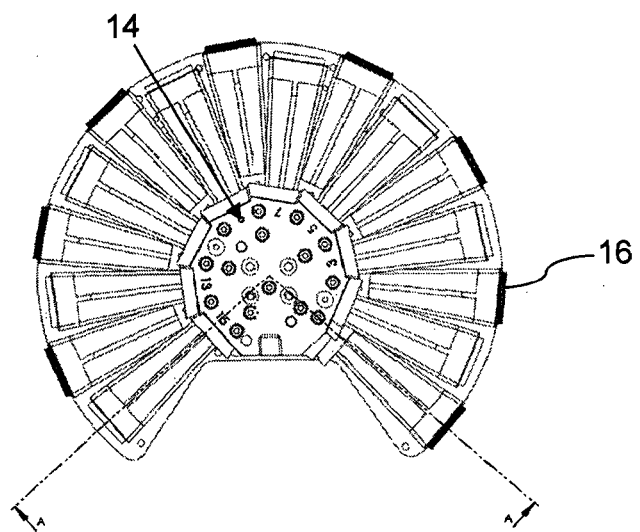
Figure 7:
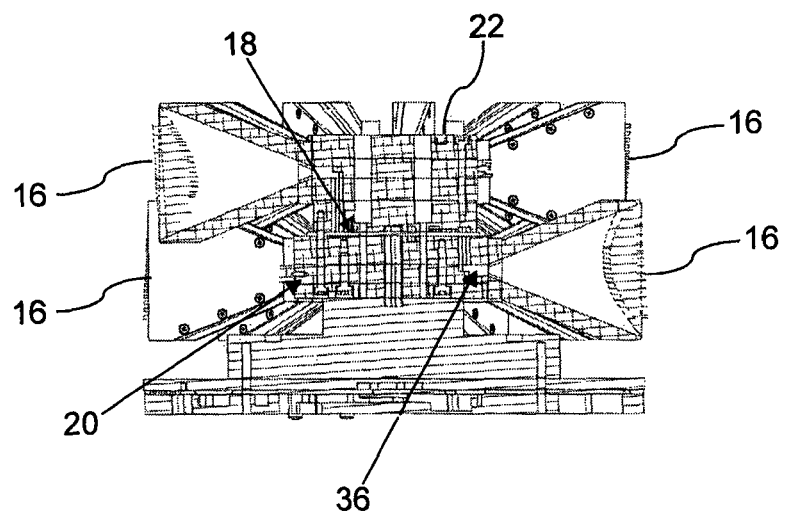
Figure 8:
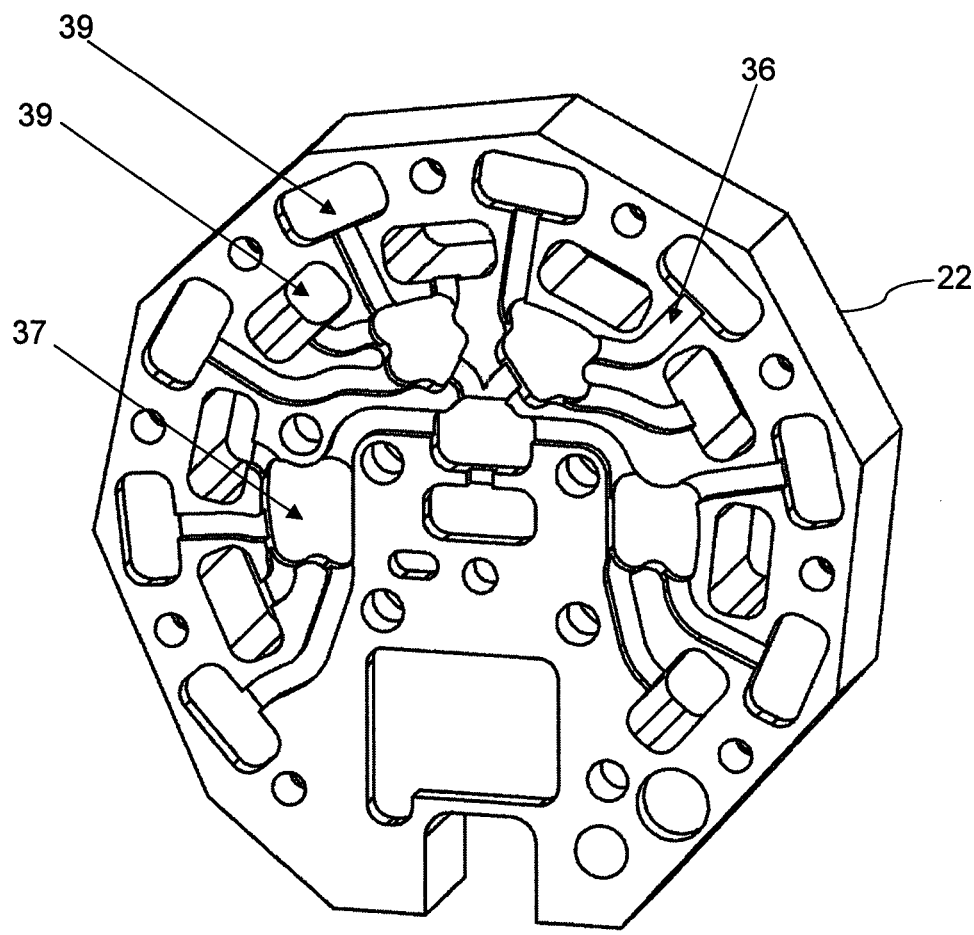
Figure 9:
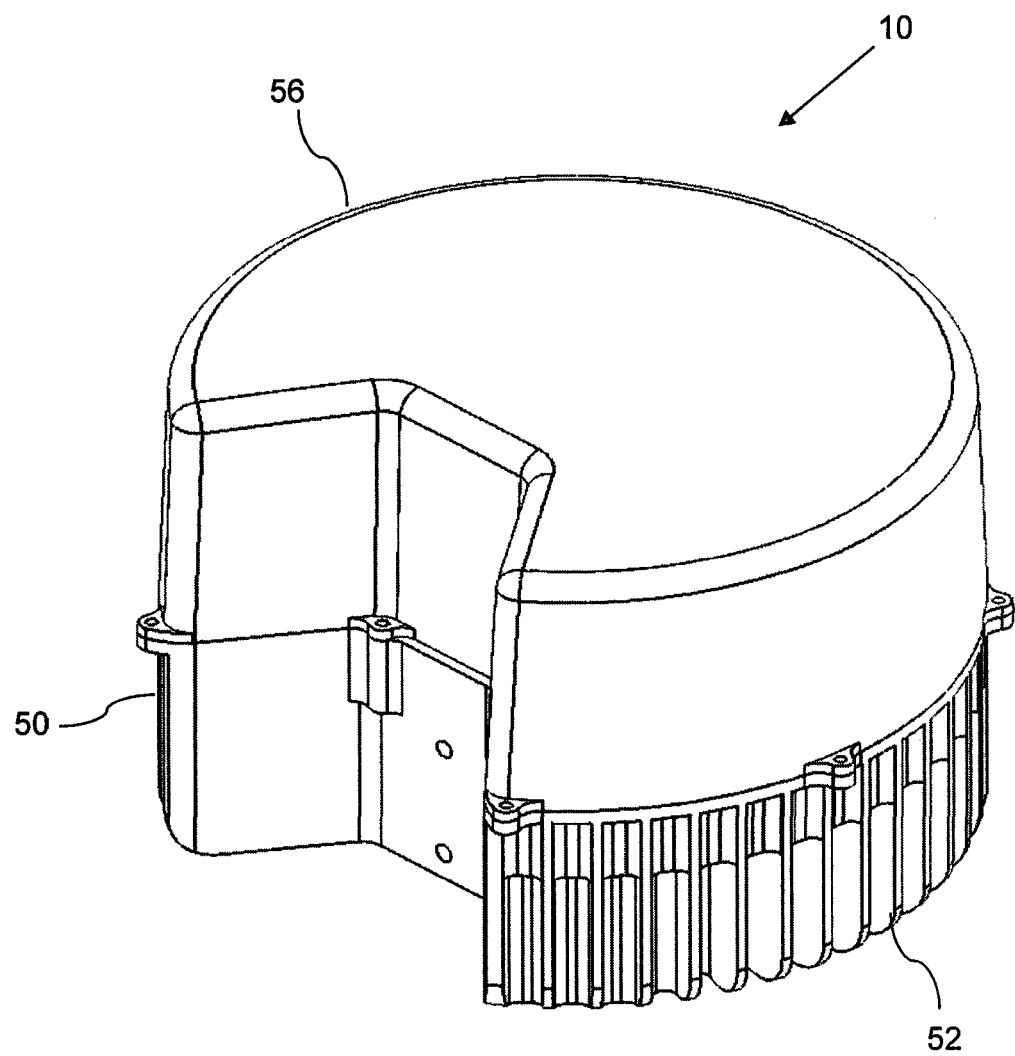
Figure 10:
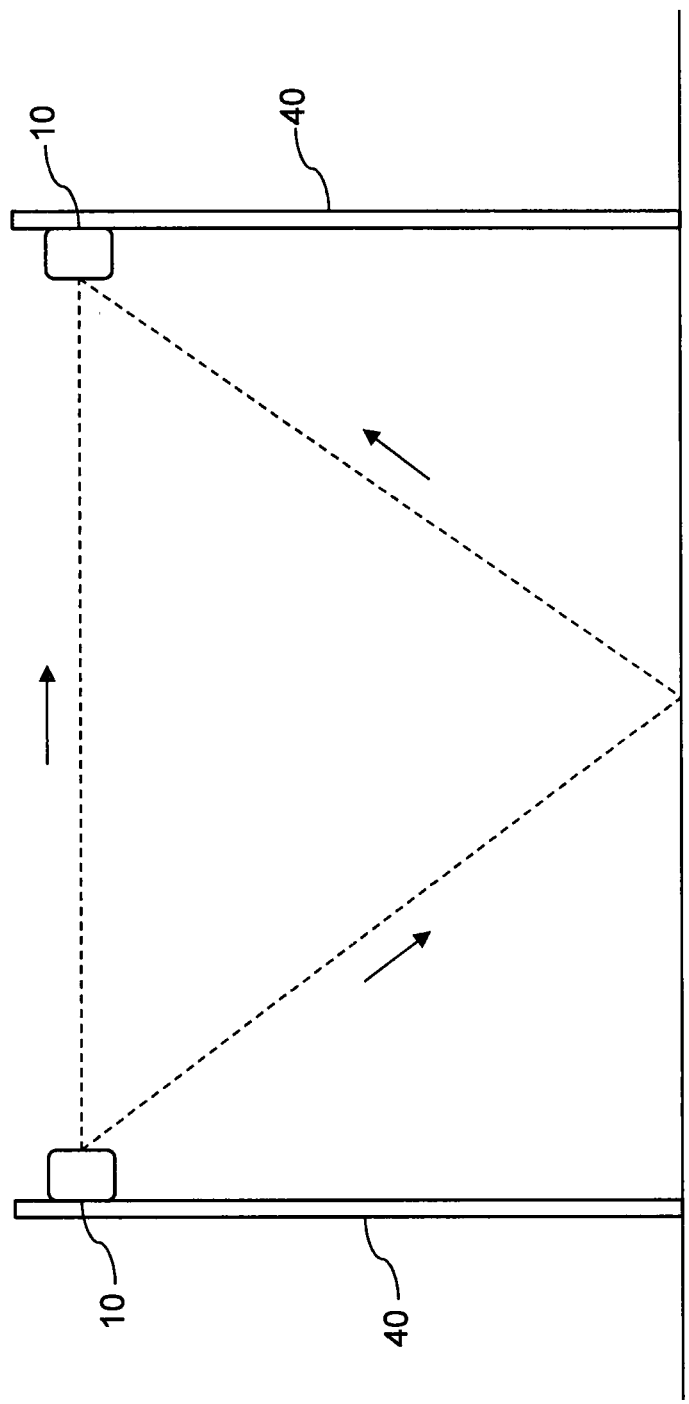

FIG. 3 is a perspective view from above of the internal components of the wireless node, FIG. 4 is a side view of the antenna configuration of the wireless node, FIG. 5 is a perspective view of an RF switch array of the wireless node, FIG. 6 is a top plan view of components of the wireless node, FIG. 7 is a section through the line A-A of FIG. 6, FIG. 8 is an underneath view of part of the RF switch array, FIG. 9 is a perspective view from above of the exterior of the wireless node, and FIG. 10 is a schematic diagram of an RF path between two mounted wireless nodes.

Figure 1:
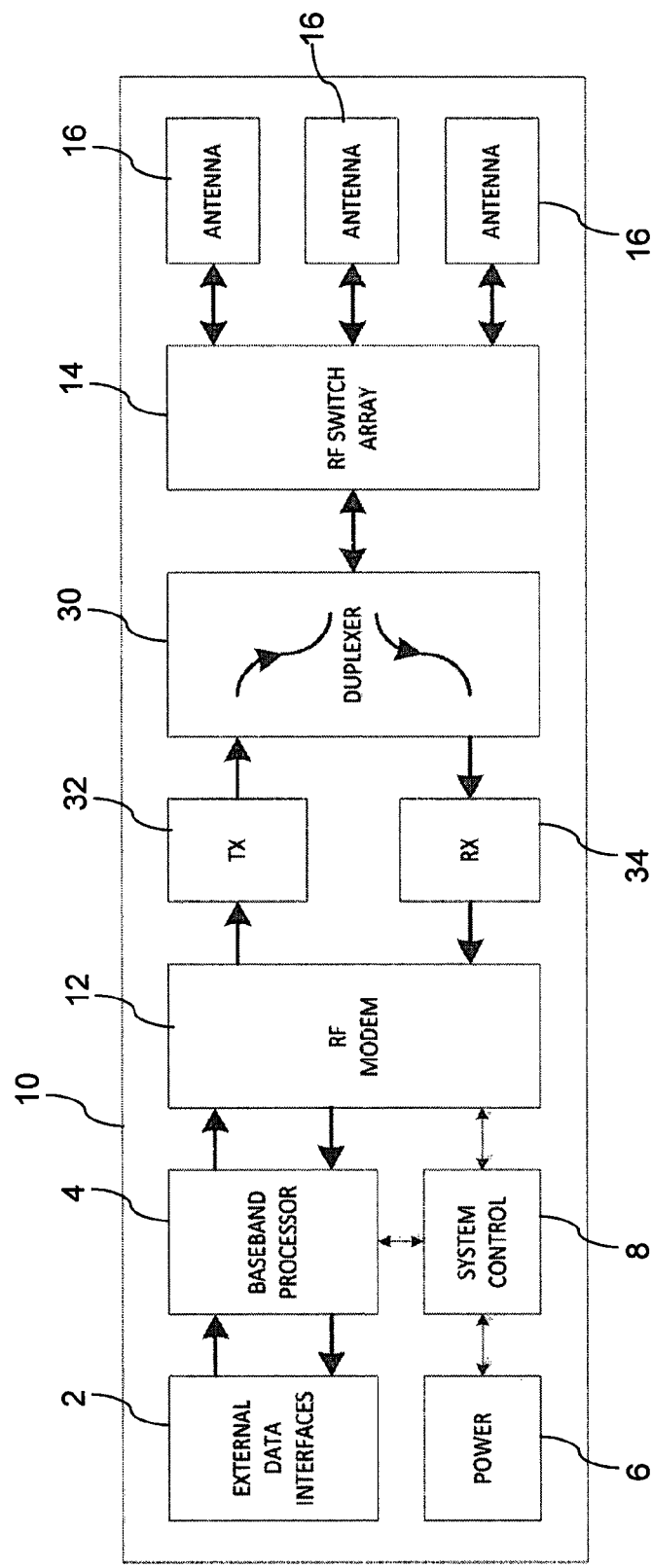
FIG. 1 is a schematic diagram of components of a wireless node.

FIG. 1 shows schematically components of a networked radio node 10. The wireless node 10 comprises a set of external data interfaces 2 that are connected to a baseband processor 4. A power supply 6 is connected to a system control component 8, which is also connected to the baseband processor 4. The wireless node 10 also comprises an RF modem 12 and an RF switch array 14 which is connected to the RF modem 12 through a duplexer 30 and a transmitter 32 and receiver 34. The RF modem 12 is also connected to the baseband processor 4 and the system control component 8. The node 10 also comprises a plurality of antennas 16 which are connected to the RF switch array 14. The antennas 16 are physically arranged around the RF switch array 14 in two horizontal planes, as can be seen in FIG. 3. The wireless node 10 comprises a central core of interlocking horizontal layers of circuit boards and conductive material, which make up the components of FIG. 1, with the exception of the antennas 16.

The RF subsystems for the node 10 are configured and arranged in a novel and clever manner that achieve a number of system critical objectives that provide an optimum pair of signal paths that keep the transmit and receive RF signal loss to a minimum. Waveguides are used to convey RF energy from one point in the RF system to another. Where RF energy is required to transition to, be carried on, or transition off a circuit board (PCB) assembly, all waveguide transitions are implemented as an integral part of the PCB. No soldering of waveguides to any of the PCB assemblies is required. The node 10 is constructed from circuit boards and aluminium layers.

The RF subsystem, at an RF building block level consists of the transmitter 32, receiver 34, duplexer 30, multi-way antenna switch 14 and antennas 16 is configured to provide horizontal plane angular coverage between 180 and 270 degrees. The mechanical implementation and the resulting stacked assembly of the RF subsystem blocks provide a novel and elegant simplicity to the design of the node 10. The duplexer 30 comprises two uni-directional ports and one bidirectional port. One uni-directional port is connected to the transmitter 32 and the other uni-directional port is connected to the receiver 34. The bidirectional port of the duplexer 30 is connected to the RF switch array 14.

Figure 2:
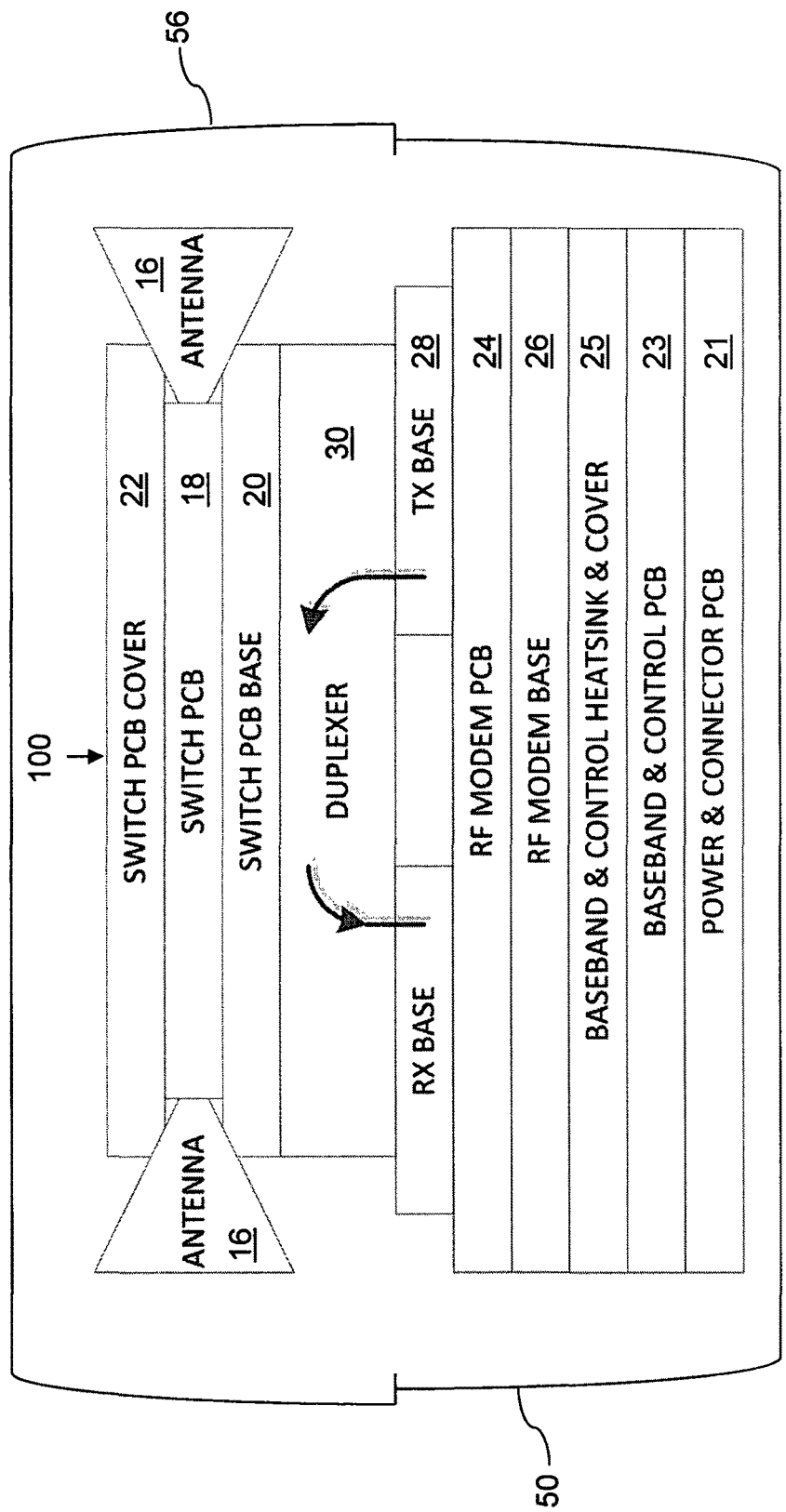
FIG. 2 is a further schematic diagram of components of the wireless node.

FIG. 2 shows schematically the physical arrangement of the components within the node 10, which comprises the central core 100 and the antennas 16, contained within a base 50 and a radome 56. At the bottom of the central core 100 is a power and connector PCB 21 (containing the external data interfaces 2 and the power supply 6), a baseband and control PCB 23 (containing the baseband processor 4 and the system control 8) and a baseband and control heatsink and cover 25. Above this is the RF modem 12, which comprises three horizontal layers of a circuit board 24 sandwiched between layers of conductive material, being the RF modem base 26 and the RX and TX cover 28. Cavities in the RF modem base 26 and RX/TX cover 28 form waveguides that are coupled into by PCB trace probes etched on the RF modem PCB 24, allowing the transmitter 32 to send RF power and the receiver 34 to receive RF signals.

The machined cavities in the RX cover and TX cover 28 (which are formed as a single continuous block) and the duplexer base block 30 continue the waveguides, connecting the bidirectional port of the duplexer 30 to the common point of the RF switch array 14. The duplexer structure 30 itself is formed from a complex arrangement of tuneable cavities and waveguide sections. The RF switch array 14 comprises three horizontal layers of a circuit board 18 sandwiched between layers of conductive material, the switch PCB base 20 and the switch PCB cover 22. Cavities in the duplexer base and cover 30 form waveguides that are coupled into by PCB trace probes on the switch PCB 18.

The switch PCB cover 22, and base 20, form waveguides from the switched nodes to each of the antennas 16 that connect to the system, with PCB probes again coupling the switched RF signal to resulting waveguides. The RF switch array 14 selects an antenna 16 from the array of antennas 16 that are arranged around the RF switch array 14 to use for the RF transmissions. The antennas 16 are so arranged to provide a wide field of view and the appropriate antenna 16 is selected by the RF switch array 14 according to the routing of the transmitted radio signal. Waveguides in the central core 100 transmit the RF energy through the node 10.

FIG. 3 shows the internal components of the wireless node 10, with the external radome 56 and base 50 removed. The plurality of antennas 16 are connected to the circuit board 18 of the RF switch array 14 via waveguides present in the layers of conductive material 20 and 22, with a first subset of the antennas 16 arranged in a first horizontal plane and a second subset of the antennas 16 arranged below the first horizontal plane in a second horizontal plane. There are eight antennas 16 in each horizontal plane. Each antenna 16 comprises a horn 16 connected to the RF switch array 14 at a proximal end of the horn 16 and open at a distal end of the horn 16. The RF switch array 14 is connected to the RF modem 12, through the duplexer 30.

Each subset of the antennas 16 defines an arc around the RF switch array 14 greater than 180 degrees and the antennas 16 define an arc around the RF switch array 14 less than 270 degrees. Adjacent antennas 16 in each subset of the antennas 16 are spaced apart from each other and the spacing between two adjacent antennas 16 in a subset of the antennas 16 is filled by an antenna 16 in the other subset of the antennas 16. Essentially the two horizontal planes of antennas 16 are out of phase with each other so that where there is a space between adjacent antennas 16 this is filled by an antenna above or below.

The antennas 16 are directional antennas 16 that have an RF field of view that is slightly wider than the actual physical width of the antenna 16. Although adjacent antennas 16 in each subset are spaced apart, the field of view of the two adjacent antennas 16 is touching or slightly overlapping to provide a full field of view in each of the two subsets of antennas 16. This means that if it is advantageous to switch to an antenna 16 that is located in the other subset of antennas 16, the line of sight can still be maintained to the target, using an antenna that is offset both horizontally and vertically.

FIG. 4 shows a side view of the antennas 16 as they are located within the wireless node 10. The radome 56 has been removed to show the antennas 16. A first subset of the antennas 16 is arranged in a first horizontal plane H1 and a second subset of the antennas 16 is arranged below the first horizontal plane H1 in a second horizontal plane H2. Eight antennas 16 are arranged in each horizontal plane and each subset of eight antennas 16 provides effectively a 270 degrees field of view, as the directional signal transmitted from the individual antennas 16 touches or overlaps with that of the signal of an adjacent antenna 16.

The wireless node 10 operates by generating radio signals at the RF modem 12, communicating the generated radio signals to the RF switch array 14, selecting an antenna 16 for transmitting the generated radio signals and transmitting the generated radio signals from the selected antenna 16. All of the antennas 16 receive RF signals from other wireless nodes 10. By having two separate horizontal layers of antennas 16, communications between two specific nodes can be optimised by choosing an antenna 16 from the whichever horizontal layer results in better signal properties from that antenna 16. In general, the antenna selection will be to avoid destructive interference from the effect of vertical multipath. The antennas 16 can be constructed in a number of different ways, depending upon the desired properties of the antennas and the manufacturing considerations such as cost. For example, each individual horn antenna 16 could be constructed from four metal sheets that are then assembled together.

FIG. 5 shows a perspective view of the RF switch array 14. This is essentially a view of the RF switch array 14 of FIG. 3, with the antennas 16 removed and viewed from the opposite side. The switch array 14 comprises a layer of circuit board sandwiched between layers of conductive material, being the switch PCB base 20 and the switch PCB cover 22, shown schematically in FIG. 2. These metal layers 20 and 22 are provided with waveguides 36 that transfer RF energy between the circuit board and the antennas 16. RF energy is transferred in both directions, depending upon whether the node 10 is transmitting or receiving. The two downward extending poles 38 are to locate the RF array 14 in the duplexer 30.

FIG. 6 shows a top plan view of the antennas 16 and the RF switch array 14 and FIG. 7 shows a vertical section through the antennas 16 and the RF switch array 14 along the lire A-A of FIG. 6. The circuit board 18 (the switch PCB) can be seen sandwiched between the switch base 20 and switch cover 22. The antennas 16 are physically connected the RF switch array 14 and the RF signal path from the antennas 16 to the circuit board 18 is via waveguides 36 present in the switch base 20 and switch cover 22. All RF energy transferred to and from the circuit board 18 is via the waveguides 36.

FIG. 8 shows the underside of part of the switch cover 22. The switch cover 22, like the other conductive layers in the central core 100 of the node 10, is formed from aluminium and has material removed to form waveguides 36 in the switch cover 22 and to create space 37 for components that are located on the switch circuit board 18. The holes 39 provide the transition from the switch PCB 18 to the waveguides 36 that lead to the antennas 16. As mentioned above, the RF switch array 14 is comprises of three horizontal layers, with the switch cover 22 forming the topmost layer. The circuit board 18 is sandwiched between the switch cover 22 and the switch base 20. Waveguides 36 are present in the layers 20 and 22 to receive and transmit RF energy from the circuit board 18 of the RF switch array 14.

FIG. 9 shows the physical exterior of a node 10. The internal components of the node 10 are contained within the base 50 and a radome 56. The deep aluminium base 50, which is waterproof, is provided with external fins 52 to aid in dissipating heat from the internal electronic components. The base 50 is made from a single cast and/or milled piece of aluminium and the radome 56 is made from a suitable plastics material. Power is supplied to the node 10 via a power cable that connects to the underside of the node 10. If the node 10 is a wired node, in addition to being a wireless node, then the wired data connection also connects to the underside of the node 10.

FIG. 10 shows two wireless nodes 10 that are mounted on poles 40, which could be lampposts for example, in an urban environment. The diagram is not to scale as there will be a significant distance between the two nodes 10. These nodes 10 form part of a network of wireless nodes 10 that communicate between one another, for example as a way of providing a connection between a wireless station of a mobile phone network and a local wired connection into the broadband backbone that handles the traffic of the mobile phone network. Multiple nodes 10 can be scattered about an urban environment and make it easier to locate the mobile phone wireless station in an urban location that does not provide the necessary wired connection.

The wireless nodes 10 are each provided with the antenna arrangements as described above and shown in FIGS. 3 and 4. A straight line of sight path between an antenna pair of the two nodes 10 will be used to communicate between the two nodes 10. However, as illustrated by the secondary path that reflects off the ground, destructive interference can occur between two nodes. For this reason, the antennas 16 of each node 10 are arranged in the two horizontal arrays. This allows switching between antennas, in order to select an antenna pair that does not suffer from destructive interference with a secondary signal that is reflected off the ground.

The invention claimed is:

1. A wireless node comprising:
   an RF modem, the RF modem comprising a layer of circuit board sandwiched between layers of conductive material,
   an RF switch array connected to the RF modem, the RF switch array comprising a layer of circuit board sandwiched between layers of conductive material, and
   a plurality of antennas connected to the circuit board of the RF switch array via waveguides present in the layers of conductive material, a first subset of the antennas arranged in a first horizontal plane and a second subset of the antennas arranged below the first horizontal plane in a second horizontal plane, wherein adjacent antennas in each subset of the antennas are spaced apart from each other and wherein the spacing between two adjacent antennas in a subset of the antennas is filled by an antenna in the other subset of the antennas.

2. The wireless node according to claim 1, wherein each antenna comprises a horn connected to the RF switch array at a proximal end of the horn and open at a distal end of the horn.

3. The wireless node according to claim 1 wherein each subset of the antennas defines an arc around the RF switch array greater than 180 degrees.

4. The wireless node according to claim 1 wherein the antennas define an arc around the RF switch array less than 270 degrees.

5. The wireless node according to claim 1, wherein half the number of antennas are located in the first horizontal plane and half the number of antennas are located in the second horizontal plane.

6. A method of operating a wireless node comprising an RF modem and an RF switch array connected to the RF modem, each of the RF modem and RF switch array comprising a layer of circuit board sandwiched between layers of conductive material, and the node further a plurality of antennas connected to the circuit board of the RF switch array via waveguides present in the layers of conductive material, a first subset of the antennas arranged in a first horizontal plane and a second subset of the antennas arranged below the first horizontal plane in a second horizontal plane, wherein adjacent antennas in each subset of the antennas are spaced apart from each other and wherein the spacing between two adjacent antennas in a subset of the antennas is filled by an antenna in the other subset of the antennas, the method comprising: generating radio signals at the RF modem, communicating the generated radio signals to the RF switch array, selecting an antenna for transmitting the generated radio signals and transmitting the generated radio signals from the selected antenna.

7. The method according to claim 6, wherein each antenna comprises a horn connected to the RF switch array at a proximal end of the horn and open at a distal end of the horn.

8. The method according to claim 6 wherein each subset of the antennas defines an arc around the RF switch array greater than 180 degrees.

9. The method according to claim 6 wherein the antennas define an arc around the RF switch array less than 270 degrees.

10. The method according to claim 6, wherein half the number of antennas are located in the first horizontal plane and half the number of antennas are located in the second horizontal plane.

11. A wireless node comprising:
    an RF modem,
    an RF switch array connected to the RF modem, and
    a plurality of antennas connected to the RF switch array via waveguides, a first subset of the plurality of antennas arranged in an arc in a first horizontal plane with intermediate spacings therebetween and a second subset of the plurality of antennas arranged in an arc in a second horizontal plane with intermediate spacings therebetween, wherein the intermediate spacings of the first subset are vertically aligned with the antennas of the second subset and the intermediate spacings of the second subset are vertically aligned with the antennas of the first subset.

* * * * *